US006994265B2

(12) United States Patent
Wehr et al.

(10) Patent No.: US 6,994,265 B2
(45) Date of Patent: Feb. 7, 2006

(54) ATM RECEIPT

(75) Inventors: Mary Ann Wehr, Hamilton, OH (US); Victoria L. B. LeBlanc, Livermore, CA (US)

(73) Assignee: NCR Corporation, Dayton, OH (US)

( * ) Notice: Subject to any disclaimer, the term of this patent is extended or adjusted under 35 U.S.C. 154(b) by 172 days.

(21) Appl. No.: 10/415,000

(22) Filed: Apr. 16, 2003

(65) Prior Publication Data

US 2004/0206830 A1 Oct. 21, 2004

(51) Int. Cl.
*G06K 21/06* (2006.01)

(52) U.S. Cl. ...................... 235/495; 235/483; 235/481; 235/475

(58) Field of Classification Search ................ 235/495, 235/483, 481; 400/207, 708, 120.01–121.03, 400/246, 619, 582, 586
See application file for complete search history.

(56) References Cited

U.S. PATENT DOCUMENTS 3,998,313 A * 12/1976 Hickey .................... 400/616.2
5,370,049 A * 12/1994 Oshino et al. .............. 101/288
5,635,704 A 6/1997 Del Signore, II et al.
5,809,390 A * 9/1998 Jackson ...................... 399/384
6,106,910 A 8/2000 Tan et al.
6,152,621 A 11/2000 Langan
6,164,851 A * 12/2000 Sakamoto et al. .......... 400/207
6,250,826 B1 * 6/2001 Kato .......................... 400/237
6,428,226 B1 8/2002 Suzuki et al.
6,600,505 B2 * 7/2003 Soshi ......................... 347/217
6,664,212 B2 * 12/2003 Ueno et al. ................. 503/227
6,755,583 B1 * 6/2004 Maruyama .................. 400/613
6,801,236 B2 * 10/2004 Araki et al. ................ 347/213
2003/0072019 A1 * 4/2003 Haines et al.
2003/0095810 A1 * 5/2003 Haines et al.
2004/0184858 A1 * 9/2004 Maruyama .................. 400/103
2004/0217168 A1 * 11/2004 Cummings .................. 235/386
2005/0056697 A1 * 3/2005 Cummings .................. 235/386

* cited by examiner

*Primary Examiner*—Diane I. Lee
*Assistant Examiner*—Kimberly D. Nguyen
(74) *Attorney, Agent, or Firm*—Adam A. Bennett

(57) ABSTRACT

A medium for printing, such as a thermal receipt roll for an ATM. The medium has two sides, each side having a plurality of marks positioned to trigger an automatic operation, such as printing, movement, or cutting of the medium when identified by a detector. Preferably, the marks are adapted for optical sensing by a detector located along one side or the other of the roll, and are positioned at regular intervals along the side edges. This allows the roll to be used in business machines having different detector configurations.

1 Claim, 1 Drawing Sheet

ATM RECEIPT

BACKGROUND OF THE INVENTION

The present invention relates generally to media products, and, more specifically, to receipt rolls for automated teller machines (ATMs) and the like.

ATMs and other conventional receipt generating business machines such as point of sale (POS) terminals and ticket dispensers typically provide a paper receipt to a customer confirming the details of a transaction. Receipts are generally of uniform length, being cut from a supply roll mounted inside the machine.

A receipt roll often has a series of uniformly spaced sense marks along one or both edges of the roll. As the roll is advanced in the machine, the sense marks trigger various operations including printing, advancing, cutting and stopping the roll. Black is the most commonly used color for sense marks employed in business machines for dispensing print media.

Machines from different manufacturers often detect sense marks from different orientations, making it impossible to use the same print media in different machines. For example, in the case of ATMs, there are at least four different designs for thermal receipt rolls for use in ATMs from different ATM manufacturers. For example, in one case, sense marks are located on opposing edges of the front side of the thermal receipt roll. In another case, sense marks are located principally along one edge of the back side of the thermal receipt roll. This creates a problem for ATM deployers who employ these two types of ATMs within their network. Specifically, service personnel must stock both types of thermal receipt rolls and make certain that the proper roll is mounted in the correct machine.

BRIEF SUMMARY OF THE INVENTION

The present invention is a medium for printing, such as a thermal receipt roll for an ATM. The medium has two sides, each side having a plurality of marks positioned to trigger an automatic operation, such as printing, movement, or cutting of the medium when identified by a detector. Preferably, the marks are adapted for optical sensing by a detector located along one side or the other of the roll, and are positioned at regular intervals along the side edges. This allows the roll to be used in business machines having different detector configurations.

DETAILED DESCRIPTION OF THE INVENTION

Figures 1, 2:
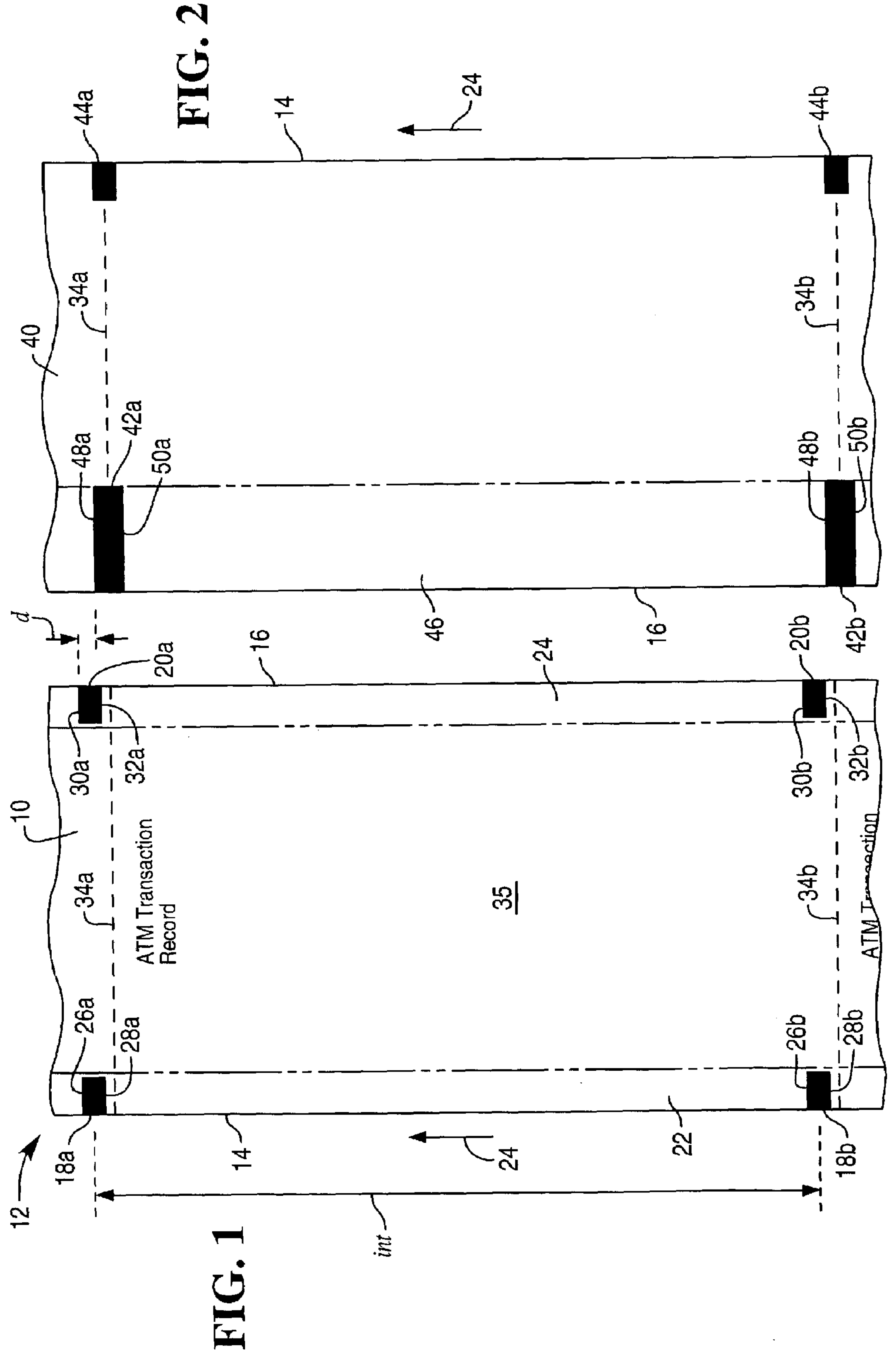
FIG. 1 is view of the front side of a section of a thermal receipt roll such as can be used in an ATM.
FIG. 2 is view of the back side of the thermal receipt roll shown in FIG. 1.

FIG. 1 shows a view of the front side 10 of a section of a thermal receipt roll 12 such as adapted for use in an ATM. Front side 10 has a conventional thermosensitive coating, as is well known in the art.

Front side 10 has opposing edges 14 and 16. Positioned along edge 14 are a plurality of optical sense marks 18*a*, 18*b*, etc. Sense marks 18*a*, 18*b*, etc. are generally rectangular in shape. They are positioned along edge 14 at a regular interval int. Interval int is defined as the distance between the midpoints of two sequentially appearing sense marks, such as marks 18*a* and 18*b*.

Positioned along edge 16 are a plurality of optical sense marks 20*a*, 20*b*, etc. Sense marks 20*a*, 20*b*, etc. are generally rectangular in shape. They are positioned along edge 16 at the same regular interval int as with sense marks 18*a* and 18*b*.

Front side 10 also has a border region 22 along edge 14 and another border region 24 along opposing edge 16. Border region 22 contains sense marks 18*a*, 18*b*, etc., but other than these sense marks has no other markings. Similarly, border region 24 contains sense marks 20*a*, 20*b*, etc., but other than these sense marks has no other markings. Sense marks 18*a*, 18*b*, etc. and sense marks 20*a*, 20*b*, etc. preferably have a lower index of reflectivity than border regions 22 and 24, for example, the sense marks are black.

The purpose for sense marks 18*a*, 18*b*, etc. and 20*a*, 20*b*, etc. is to serve as a marker for an optical detector as the roll is advanced in the ATM. When the detector senses the presence of a mark, various operations can be triggered such as printing, cutting, or movement (advancing or stopping) of roll 12. The ATM can be configured so that either sense marks 18*a*, 18*b*, etc., or sense marks 20*a*, 20*b*, etc., or both groups are sensed by the detector(s).

As shown in FIG. 1, roll 12 has a feed direction when installed in an ATM as designated by arrow 24. The feed direction defines leading and trailing edges for each of the sense marks. For example, sense mark 18*a* has a leading edge 26*a* and a trailing edge 28*a*. Similarly, sense mark 18*b* has a leading edge 26*b* and a trailing edge 28*b*. In a like manner, sense mark 20*a* has a leading edge 30*a* and a trailing edge 32*a*, and sense mark 20*b* has a leading edge 30*b* and a trailing edge 32*b*.

Sense marks 20*a*, 20*b*, etc. are in registration with sense marks 18*a*, 18*b*, etc. What is meant by "in registration" is that the leading edge 26*a* of mark 18*a* is directly opposite and aligned with the leading edge 30*a* of mark 20*a*. Similarly, the trailing edge 28*a* of mark 18*a* is directly opposite and aligned with the trailing edge 32*a* of mark 20*a*. In a like manner, leading and trailing edges 26*b* and 28*b* of sense mark 18*b* are opposite and aligned with leading and trailing edges 30*b* and 32*b*, respectively, of sense mark 20*b*.

Also shown are designated cut lines 34*a* and 34*b*. In the embodiment shown, cut line 34*a* is slightly behind the trailing edges 28*a* and 32*a* of sense marks 18*a* and 20*a*, respectively. Similarly, cut line 34*b* is behind the trailing edges 28*b* and 32*b* of sense marks 18*b* and 20*b*, respectively. It will be appreciated for each receipt generating transaction conducted at an ATM, a single cutting operation will be performed on roll 12. Thus, eventually, a cutting operation will be performed along cut line 34*a*. For the following receipt generating transaction at the ATM, the cutting operation will be performed at cut line 34*b*, which is behind the trailing edges 28*b* and 32*b* of sense marks 18*b* and 20*b*, respectively. At that time a receipt 35 will be dispensed to the user of the ATM.

Receipt 35 may include preprinted information, such as "ATM Transaction Record," shown in FIG. 1 on the front side 10. It will also include transaction specific information (not shown) printed by means of a thermal print head on the thermosensitive coating.

FIG. 2 shows a view of the back side 40 of a section of thermal receipt roll 12, which corresponds to the view shown in FIG. 1. Back side 40 does not have a thermosensitive coating.

Back side 40 has opposing edges 14 and 16. Positioned along edge 16 are a plurality of optical sense marks 42*a*, 42*b*, etc. Sense marks 42*a*, 42*b*, etc. are generally rectangular in shape. They are positioned along edge 16 at a regular interval. In a preferred embodiment, the interval is the same regular interval int, as shown and described with respect to FIG. 1.

Positioned along edge 14 are a plurality of marks 44*a*, 44*b*, etc., which are generally in registration with marks 42*a*, 42*b*, etc., respectively, but are not sensed by an optical sensor. Their presence is related to the manufacturing process of roll 12. Specifically, roll 12 is cut from a much wider roll. In order to allow for some manufacturing tolerances, marks 44*a* and 44*b* are extensions from adjoining marks on the wider roll. Thus, sense marks 44*a*, 44*b*, etc. are positioned along edge 18 at the same regular interval int as with sense marks 42*a* and 42*b*. Back side 40 also has a border region 46 along edge 16. Border region 46 contains sense marks 42*a*, 42*b*, etc., and, other than these sense marks, has no other markings. Sense marks 42*a*, 42*b*, etc. preferably have a lower index of reflectivity than border region 46, for example, the sense marks are black.

As with sense marks 18*a*, 18*b*, etc. and 20*a*, 20*b*, etc. on the front side 10 of receipt roll 12, the purpose of sense marks 42*a*, 42*b*, etc. is to serve as a marker for an optical detector as the roll is advanced in the ATM. When the detector senses the presence of a mark, various operations can be triggered such as printing, cutting, or movement (advancing or stopping) of roll 12. However, an ATM will either have a detector for sensing marks on the front 10 of roll 12, or on the back 40, but not both. Thus, the sense marks 42*a*, 42*b*, etc. would not be needed in ATMs from certain manufacturers, just at sense marks 18*a*, 18*b*, etc. and 20*a*, 20*b*, etc. would not be needed in ATMs from other manufacturers. However, the same roll 12 will be operable in ATMs from either manufacturer.

The feed direction of roll 12 when installed in an ATM, as designated by arrow 24, is obviously in the same direction in both FIGS. 1 and 2. In FIG. 2, the feed direction defines leading and trailing edges for each of the sense marks. For example, sense mark 42*a* has a leading edge 48*a* and a trailing edge 50*a*. Similarly, sense mark 42*b* has a leading edge 48*b* and a trailing edge 50*b*.

Sense marks 42*a*, 42*b*, etc. are out of registration with sense marks 18*a*, 18*b*, etc., and sense marks 20*a*, 20*b*, etc. What is meant by "out of registration" is that the leading edge 48*a* of mark 42*a* is not aligned with the leading edge 26*a* of mark 18*a* or leading edge 30*a* of mark 20*a*. The amount of misalignment is shown as distance d. Similarly, the trailing edge 50*a* of mark 42*a* is out of registration with the trailing edge 32*a* of mark 20*a* and with the trailing edge 28*a* of mark 18*a*. In a like manner, leading and trailing edges 48*b* and 50*b* of sense mark 42*b* are out of registration with leading and trailing edges 30*b* and 32*b*, respectively, of sense mark 20*b*, and with leading and trailing edges 26*b* and 28*b*, respectively, of sense mark 18*b*.

Referring to both FIG. 1 and FIG. 2, it will be seen that in a preferred embodiment, the leading edge 26*a* of mark 18*a* and the leading edge 30*a* of mark 20*a* are forward of the leading edge 48*a* of mark 42*a*. Similarly, the leading edge 26*b* of mark 18*b* and the leading edge 30*b* of mark 20*b* are forward of the leading edge 48*b* of mark 42*b*. "Forward" in this usage having reference to direction 24.

Also shown in FIG. 2 are designated cut lines 34*a* and 34*b*. In the embodiment shown, cut line 34*a* is between the leading edge 48*a* and trailing edge 50*a* of mark 42*a*. Similarly, cut line 34*b* is between the leading edge 48*b* and trailing edge 50*b* of mark 42*b*.

Receipt 35 may include preprinted information, such as advertisements, coupons, or terms and conditions (not shown) on the back side 40. Such printing will not extend into border region 46. The back side 40 of receipt 35 will not include transaction specific information because all printing on the receipt within the ATM is on front side 10, which has a thermosensitive coating.

One issue concerning sense marks 20*a*, 20*b*, etc., 42*a*, 42*b*, etc., and 44*a*, 44*b*, etc. are their relative optical density, particularly in connection with the light transmissivity of roll 12. Specifically, if the marks are too dense, there can be "bleed through" to the opposite side, which can interfere with the operation of the detector. For example, if mark 20*a* bleeds through to side 40 with too much intensity, it may trigger a premature automatic operation. This in turn can result in parts of receipt 35 being cut off.

In a preferred embodiment, thermal roll 12 is formed from a 15# thermal paper having a thermosensitive coating on one side, sense marks 18*a*, 18*b*, etc., and 20*a*, 20*b*, etc. are preprinted with an optical density of between 0.95 to 1.15, with a preferred density of 1.1, and sense marks 42*a*, 42*b*, etc., and 44*a*, 44*b*, etc. are preprinted with a minimum optical density of 1.15, with a preferred density of 1.25.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. A thermal receipt roll for an ATM, comprising:

a front side with a thermosensitive coating having a plurality of first optical sensing marks positioned at a first regular interval along one edge of said front side;

a back side including a border region and a printable region, said border region being positioned along one edge of said back side and having a plurality of second optical sensing marks that are positioned at a second regular interval along said border region;

a plurality of third optical sensing marks positioned at said first regular interval along the opposing edge from said first marks on said front side of said receipt roll, wherein said third marks are in registration with said first marks;

border regions along each edge of said front side, said regions having no markings other than said first and third marks;

a border region along said one edge of said back side, which has no markings other than said second marks; and a plurality of fourth marks positioned at said first regular interval along the opposing edge from said second marks on said back side of said receipt roll;

wherein said first and second intervals are the same, and wherein said first and second marks are out of registration with each other;

wherein said roll has a designated feed direction when installed within said ATM, and wherein said first and second marks have a leading edge as defined by said feed direction, and wherein the leading edge of each of said first marks is forward of the leading edge of the corresponding ones of each of said second marks;

wherein said first and second marks have a trailing edge, wherein said roll has a designated cut line where said roll is cut into a receipt, and wherein said cut line is behind the trailing edge of said first mark, but between the leading and trailing edges of said second mark.

* * * * *